United States Patent
Ogiwara et al.

(10) Patent No.: US 9,725,291 B2
(45) Date of Patent: Aug. 8, 2017

(54) REFUELING AUXILIARY DEVICE

(71) Applicant: HONDA MOTOR CO., LTD., Tokyo (JP)

(72) Inventors: Naoki Ogiwara, Wako (JP); Yuusuke Sakaguchi, Wako (JP); Masayoshi Tsuchida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 85 days.

(21) Appl. No.: 14/818,441

(22) Filed: Aug. 5, 2015

(65) Prior Publication Data

US 2016/0083244 A1   Mar. 24, 2016

(30) Foreign Application Priority Data

Sep. 24, 2014   (JP) ................................ 2014-193226

(51) Int. Cl.
| | |
|---|---|
| *B65B 39/00* | (2006.01) |
| *B67C 11/02* | (2006.01) |
| *B60K 15/04* | (2006.01) |
| *B67C 11/00* | (2006.01) |
| *B67D 7/00* | (2010.01) |

(52) U.S. Cl.
CPC .............. *B67C 11/02* (2013.01); *B60K 15/04* (2013.01); *B60K 2015/0429* (2013.01); *B60K 2015/0461* (2013.01); *B67C 2011/20* (2013.01); *B67D 7/005* (2013.01)

(58) Field of Classification Search
CPC .. B67D 7/54; B67D 7/05; B67C 11/02; B67C 2011/20
See application file for complete search history.

(56) References Cited

U.S. PATENT DOCUMENTS

| | | | | |
|---|---|---|---|---|
| 918,814 | A | * 4/1909 | Barney ................... | B67C 11/02 |
| | | | | 141/300 |
| 2,811,181 | A | * 10/1957 | Correll .................... | B67C 11/02 |
| | | | | 141/340 |

(Continued)

FOREIGN PATENT DOCUMENTS

| | | |
|---|---|---|
| JP | S58-160300 A | 9/1983 |
| JP | 2006-15946 A | 1/2006 |
| JP | 2013-509328 A | 3/2013 |

OTHER PUBLICATIONS

Notification of Reasons for Refusal dated Jan. 10, 2017, issued in counterpart Japanese Patent Application No. 2014-193226, with English translation. (6 pages).

*Primary Examiner* — Jason K Niesz
(74) *Attorney, Agent, or Firm* — Westerman, Hattori, Daniels & Adrian, LLP

(57) ABSTRACT

A capless refueling mechanism includes a fill opening side shut-off valve disposed near the fill opening, and a fuel tank side shut-off valve disposed nearer to a fuel tank than the fill opening side shut-off valve. The refueling auxiliary device has a guide pipe section and a funnel section, and pressing of the fill opening side shut-off valve and the fuel tank side shut-off valve via an end of the guide pipe section causes a valve element to be moved away from a seat portion and insertion of a nozzle into the funnel section allows refueling. The outer circumferential surface of the guide pipe section is provided with an enlarged diameter section that regulates a valve opening degree of the valve element of the fuel tank side shut-off valve.

9 Claims, 4 Drawing Sheets

(56) References Cited

U.S. PATENT DOCUMENTS 6,691,750 B1 2/2004 Foltz
2014/0174602 A1* 6/2014 Baker .................. F01M 11/04
141/332

* cited by examiner

REFUELING AUXILIARY DEVICE

CROSS REFERENCES TO RELATED APPLICATIONS

The present application claims priority under 35 U.S.C. §119 to Japanese Patent Application No. 2014-193226, filed Sep. 24, 2014, entitled "Refueling Auxiliary Device." The contents of this application are incorporated herein by reference in their entirety.

TECHNICAL FIELD

The present disclosure relates to a refueling auxiliary device that is used for a vehicle having a capless refueling mechanism at the end of a filler pipe.

BACKGROUND

For instance, Japanese Unexamined Patent Application Publication (Translation of PCT Application) (JP-T) No. 2013-509328 discloses a capless refueling system that is disposed at the end of a filler pipe and utilizes snap mounting of a valve assembly. It is to be noted that "capless" indicates that a fuel cap conventionally provided in the fill opening is not provided.

The valve assembly includes a lower main body and an upper cover. In the lower main body, a flapper valve is disposed that is urged by a spring to a seated state. In the upper cover, another flapper valve is disposed that is urged by a spring to a seated state.

There is a case where an emergency nozzle (refueling auxiliary device) is inserted into the fill opening provided at the end of the filler pipe for refueling. In this case, for instance, when the end of the filler pipe is provided with the capless refueling system presented by JP-T No. 2013-509328, fuel vapor may blow back through the fill opening to the outside when the emergency nozzle is inserted.

That is, when the flapper valve of the capless refueling system is pressed by the end of the emergency nozzle and is fully opened, a fuel path sealed in the filler pipe is changed from in a pressurized state to an atmospheric release state rapidly, and thus fuel vapor may blow back to the outside.

SUMMARY

The present disclosure has been made, for example, in view of the above-mentioned points and provides a refueling auxiliary device capable of reducing blow-back of fuel vapor to the outside in a capless refueling mechanism.

One aspect of the present disclosure provides a refueling auxiliary device which is used for a vehicle including a capless refueling mechanism and part of which is to be inserted into the capless refueling mechanism that includes a fill opening side shut-off valve disposed near a fill opening and a fuel tank side shut-off valve that is disposed nearer to a fuel tank than the fill opening side shut-off valve, the refueling auxiliary device including: a funnel section; a guide pipe section that is connected to the fuel tank side of the funnel section and that presses and moves the fill opening side shut-off valve and the fuel tank side shut-off valve away from a seat portion; and a regulation unit that regulates a valve opening degree of the fuel tank side shut-off valve.

Accordingly, when the guide pipe section of the refueling auxiliary device is inserted into the capless refueling mechanism, the valve opening degree of the fuel tank side shut-off valve is regulated by the regulation unit and thus full open state of the fuel tank side shut-off valve is avoidable. Consequently, it is possible to gradually decrease the internal pressure of the fuel vapor in the filler pipe and to avoid blow-back of fuel vapor to the outside. In other words, since the fuel tank side shut-off valve is slightly opened due to the regulation unit provided, burst discharge of the fuel vapor in the filler pipe to the outside is avoidable.

Also, the regulation unit is an enlarged diameter section that is provided on the outer circumferential surface of the guide pipe section and that is reversely tapered gradually toward the funnel section.

Accordingly, the enlarged diameter section is provided on the outer circumferential surface of the guide pipe section, thereby enabling easy setting of the amount of insertion of the end of the guide pipe section into the filler pipe as well as easy manufacturing due to a simple structure.

Furthermore, a fuel vapor shield section that shields fuel vapor is provided between the guide pipe section and the funnel section.

Accordingly, when the fuel vapor shield section is provided between the guide pipe section and the funnel section, in contrast with the case where the fuel vapor shield section is provided in another location, the length of the guide pipe section is not increased and the outer diameter of the fill opening side shut-off valve is not increased, and thus the fuel vapor shield section may be easily provided. In addition, manufacturing is made more simple by providing the fuel vapor shield section integrally with the guide pipe section and the funnel section.

Furthermore, an end of the funnel section, through which a nozzle is inserted, is provided with a check valve.

Accordingly, it is possible to further reduce blow-back of fuel vapor to the outside by providing the check valve at the end of the funnel section.

BRIEF DESCRIPTION OF THE DRAWINGS

The advantages of the disclosure will become apparent in the following description taken in conjunction with the following drawings.

DETAILED DESCRIPTION

Figure 1:
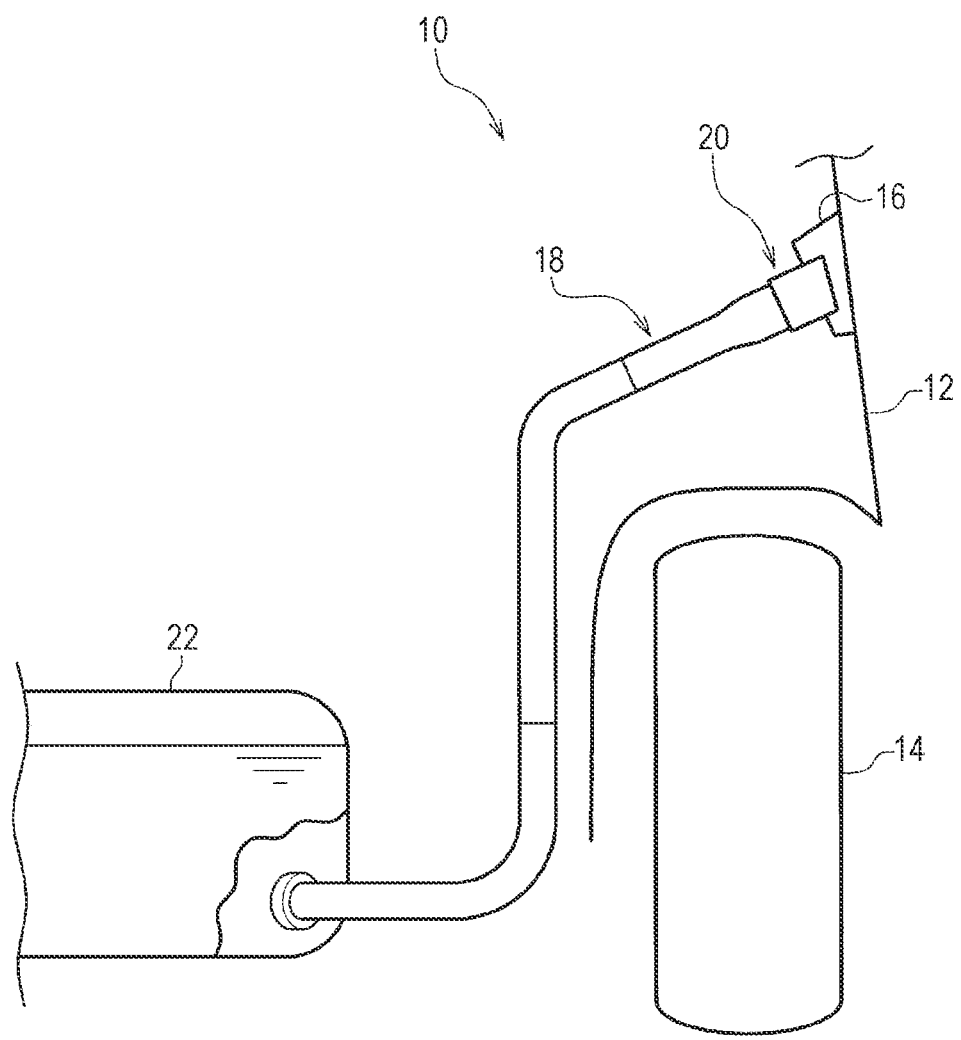
FIG. 1 is a schematic configuration of a refueling structure as viewed from the rear of a vehicle, the refueling structure including a capless refueling mechanism in which a refueling auxiliary device according to an embodiment of the present disclosure is inserted.

Next, an embodiment of the present disclosure will be described in detail with reference to the drawings as needed. FIG. 1 is a schematic configuration of a refueling structure as viewed from the rear of a vehicle, the refueling structure including a capless refueling mechanism in which a refueling auxiliary device according to an embodiment of the present disclosure is inserted, and FIG. 2 is an enlarged sectional view of the capless refueling mechanism illustrated in FIG. 1.

As illustrated in FIG. 1, a refueling structure 10 is provided in a rear fender panel 12 that is located, for example, in a rear portion of a vehicle body. The inner side of the rear fender panel 12 in a vehicle width direction is equipped with an adapter 16 that is located over a rear tire 14 and has an opening. On the side of the rear fender panel 12, that is opposed to the adapter 16, a lid (not illustrated) is mounted via a hinge in an openable and closable manner.

Figure 2:
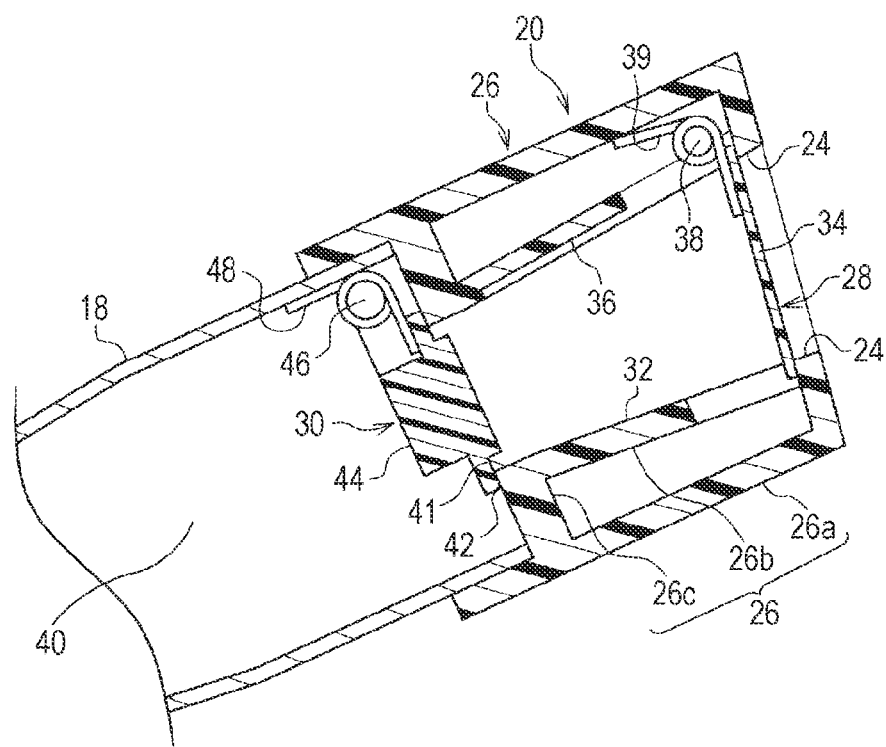
FIG. 2 is an enlarged sectional view of the capless refueling mechanism illustrated in FIG. 1.

In addition, as illustrated in FIG. 2, the refueling structure 10 has a filler pipe 18 in which a fuel supply passage 40 is formed. As illustrated in FIG. 1, one end of the filler pipe 18 is connected to a capless refueling mechanism 20 close to the rear fender panel 12, and the other end of the filler pipe 18 is connected to a fuel tank 22 that stores fuel. The capless refueling mechanism 20 has a substantially circular-shaped fill opening 24 supported by the adapter 16 (see FIG. 2).

As illustrated in FIG. 2, the capless refueling mechanism 20 includes a substantially cylindrical-shaped main body 26 that is mounted on the distal end of the filler pipe 18, a fill opening side shut-off valve 28 that is disposed in the main body 26 near the fill opening 24, and a fuel tank side shut-off valve 30 that is disposed in a connection portion between the main body 26 and the filler pipe 18, nearer to the fuel tank 22 than the fill opening side shut-off valve 28.

The main body 26 has a cylindrical external wall 26a, an inner circumferential wall 26b that gradually tapers from the fill opening 24 toward the fuel tank side shut-off valve 30, and a bottom wall 26c that is located at the back of the inner circumferential wall 26b and on the opposite side of the fill opening 24. The inner circumferential wall 26b has an engagement surface 32 that comes into contact with the later-described enlarged diameter section 58 of a refueling auxiliary device 50 to regulate the amount of insertion of a guide pipe section 52 into the filler pipe 18, and a storage recess 36 that stores the later-described shutter 34.

The fill opening side shut-off valve 28 is formed of a shutter 34 that opens and closes the fill opening 24. The shutter 34 is urged by the spring force of a spring member 39 mounted on a pin 38 so that the fill opening 24 is in a closed state normally. In addition, the shutter 34 is designed to be stored in the storage recess 36 formed in the inner circumferential wall 26b when being pressed by the later-described guide pipe section 52 and set in an open state (see FIG. 4 mentioned later).

The fuel tank side shut-off valve 30 is formed of an opening and closing valve that opens and closes a communication hole 41 through which the fill opening 24 in the main body 26 and the fuel supply passage 40 in the filler pipe 18 communicate with each other. The fuel tank side shut-off valve 30 has a valve element 44 that is seated on a seat portion 42 and closes the communication hole 41, the seat portion 42 being formed on the bottom wall 26c of the main body 26. The valve element 44 is urged by the spring force of a spring member 48 mounted on a support pin 46 so that the communication hole 41 is in a closed state normally. It is to be noted that the fill opening 24 and the communication hole 41 are disposed to be opposed to each other at one end side and the other end side of the main body 26 in its axial direction.

Figure 3:
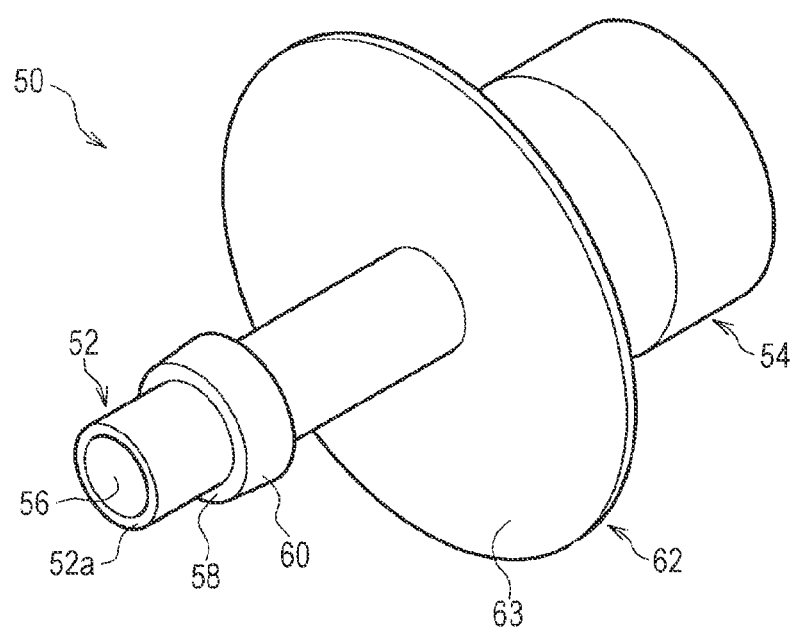
FIG. 3 is an enlarged perspective view of the refueling auxiliary device according to the embodiment of the present disclosure.
Figure 4:
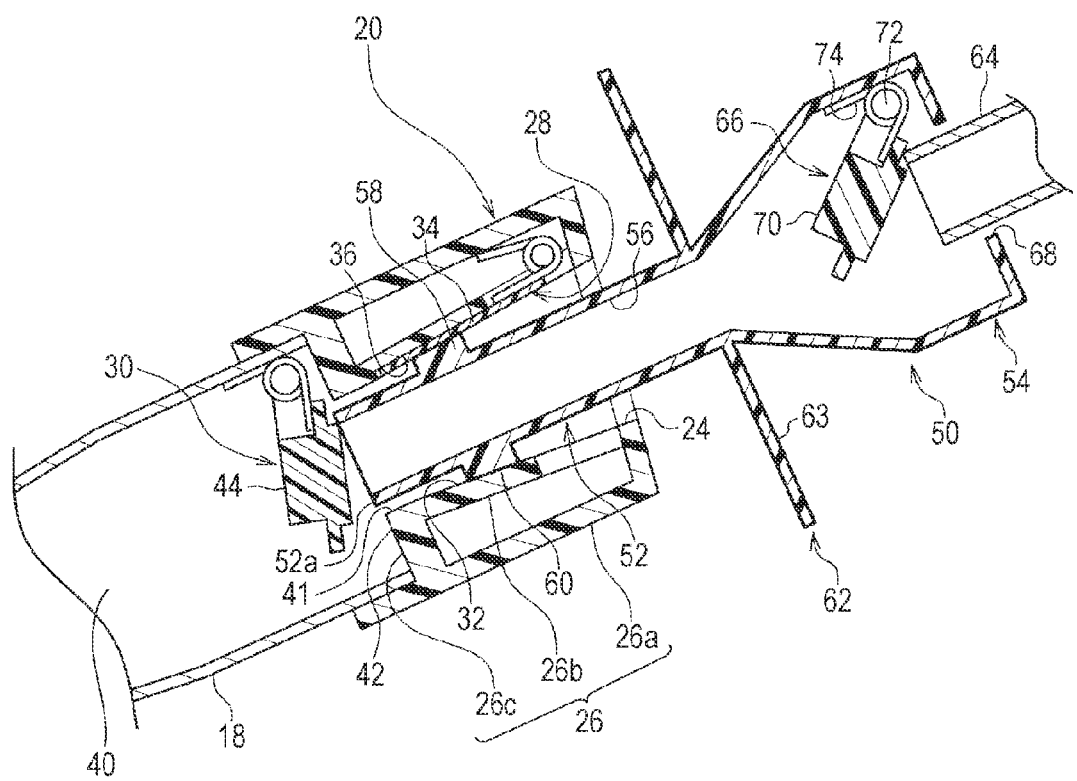
FIG. 4 is a sectional view of the capless refueling mechanism illustrated in FIG. 2 with the refueling auxiliary device according to the embodiment of the present disclosure inserted.

FIG. 3 is an enlarged perspective view of the refueling auxiliary device according to the embodiment of the present disclosure, and FIG. 4 is a sectional view of the capless refueling mechanism illustrated in FIG. 2 with the refueling auxiliary device according to the embodiment of the present disclosure inserted.

The refueling auxiliary device 50 is to be used, for instance, in emergency such as running out of gas, and is mounted at a predetermined position in the vehicle. As illustrated in FIG. 3, the refueling auxiliary device 50 has a substantially conical funnel section 54, and a substantially cylindrical-shaped guide pipe section 52 connected to the side of the funnel section 54, near the fuel tank 22.

It is to be noted that although a case is exemplified in which the guide pipe section 52 and the funnel section 54 are integrally formed of resin material in the present embodiment, the disclosure is not limited to this. For instance, the guide pipe section 52 and the funnel section 54 may be separately formed then both may be integrally bonded by a bonding method such as welding. Alternatively, the guide pipe section 52 and the funnel section 54 may be formed of a metal material (for instance, light metal such as aluminum).

As illustrated in FIG. 4, the guide pipe section 52 is in a substantially cylindrical shape and the inside has a through hole 56 that communicates with the fuel supply passage 40 in the filler pipe 18 in an axial direction. An axially intermediate portion of the outer circumferential surface of the guide pipe section 52 is provided with the enlarged diameter section (regulation unit) 58 that has an radially outwardly enlarged diameter and regulates valve opening degree of the fuel tank side shut-off valve 30.

The outer circumferential surface of the enlarged diameter section 58 has a tapered surface 60 that gradually tapers from the funnel section 54 direction toward a tip end 52a of the guide pipe section 52. Contact of the tapered surface 60 with the engagement surface 32 of the inner circumferential wall 26b regulates the amount of entry (the amount of insertion) of the end 52a of the guide pipe section 52 into the filler pipe 18 (the fuel supply passage 40).

As illustrated in FIG. 3, FIG. 4, a boundary portion located between the guide pipe section 52 and the funnel section 54 is provided with a fuel vapor shield section 62 that shields fuel vapor. The fuel vapor shield section 62 is composed of, for instance, resin material, and is formed of a disk section 63 that is formed integrally with the guide pipe section 52 and the funnel section 54. The diameter (outer diameter) of the disk section 63 is set to be larger than the diameter (inner diameter) of the fill opening 24. It is to be noted that after the fuel vapor shield section 62 is manufactured as a separate unit from the guide pipe section 52 and the funnel section 54, the fuel vapor shield section 62 may be connected to a boundary portion between the guide pipe section 52 and the funnel section 54 by adhesion or welding, for instance.

An end of the funnel section 54, to which a carrying can attached nozzle 64 is inserted, is provided with a check valve 66. The end of the funnel section 54 has an opening 68 to which, for instance, the carrying can attached nozzle 64 is insertable, and the opening 68 is provided to be openable and closable by the check valve 66.

The check valve 66 has a valve element 70 that opens and closes the opening 68 of the funnel section 54. The valve element 70 is urged by the spring force of a spring member 74 mounted on a support pin 72 so that the opening 68 of the funnel section 54 is in a closed state normally.

The refueling structure 10 including the capless refueling mechanism 20, to which the refueling auxiliary device 50 according to the present embodiment is inserted, is basically configured as described above. Next, the operation effect will be described.

For instance, in emergency such as running out of gas, the refueling auxiliary device 50 is inserted by a worker into the capless refueling mechanism 20 provided at the end of the filler pipe 18. The end 52a of the guide pipe section 52, inserted through the fill opening 24, of the refueling auxiliary device 50 presses against the shutter 34 of the fill opening side shut-off valve 28 and causes the fill opening 24 to be in an open state, then the guide pipe section 52 is further inserted into the filler pipe 18 along the inner circumferential wall 26b. The guide pipe section 52 presses the valve element 44 of the fuel tank side shut-off valve 30, and moves the valve element 44 slightly away from the seat portion 42.

In this process, the tapered surface 60 of the enlarged diameter section 58 of the guide pipe section 52 comes into contact with the engagement surface 32 provided on the inner circumferential wall 26b of the capless refueling mechanism 20, and insertion of the end 52a of the guide pipe section 52 into the filler pipe 18 is thereby blocked. This regulates the valve opening degree of the valve element 44 that has moved away from the seat portion 42, and full open state of the valve element 44 is avoidable. As a result, it is possible to protect the fuel vapor sealed in the filler pipe 18 from burst discharge through the fill opening 24 to the outside.

After the refueling auxiliary device 50 is inserted to the capless refueling mechanism 20, the carrying can attached nozzle 64 (not illustrated) is inserted through the opening 68 of the funnel section 54 and fuel (for instance, gasoline) stored in the carrying can may be supplied to the fuel tank 22 via the filler pipe 18.

In this manner, in the present embodiment, when the guide pipe section 52 of the refueling auxiliary device 50 is inserted into the capless refueling mechanism 20, the valve opening degree of the valve element 44 of the fuel tank side shut-off valve 30 is regulated by the enlarged diameter section 58 which is provided on the outer circumferential surface of the guide pipe section 52, and thus full open state of the valve element 44 of the fuel tank side shut-off valve 30 is avoidable. Consequently, it is possible to gradually decrease the internal pressure of the fuel vapor in the filler pipe 18 and to avoid blow-back of fuel vapor to the outside.

In other words, in the present embodiment, since the valve element 44 of the fuel tank side shut-off valve 30 is slightly opened due to the enlarged diameter section 58 provided, burst of discharge of the fuel vapor in the filler pipe 18 to the outside is avoidable.

Also, in the present embodiment, the enlarged diameter section 58 is provided on the outer circumferential surface of the guide pipe section 52, thereby enabling easy setting of the amount of insertion of the end 52a of the guide pipe section 52 into the filler pipe 18 as well as easy manufacturing due to a simple structure.

Although the enlarged diameter section 58, which functions as a regulation unit, is provided in the guide pipe section 52 of the refueling auxiliary device 50 in the present embodiment, for instance, an annular projection section that projects radially inward may be provided on the inner circumferential wall 26b of the capless refueling mechanism 20 to regulate the amount of insertion of the guide pipe section 52 into the filler pipe 18.

Figure 5A:
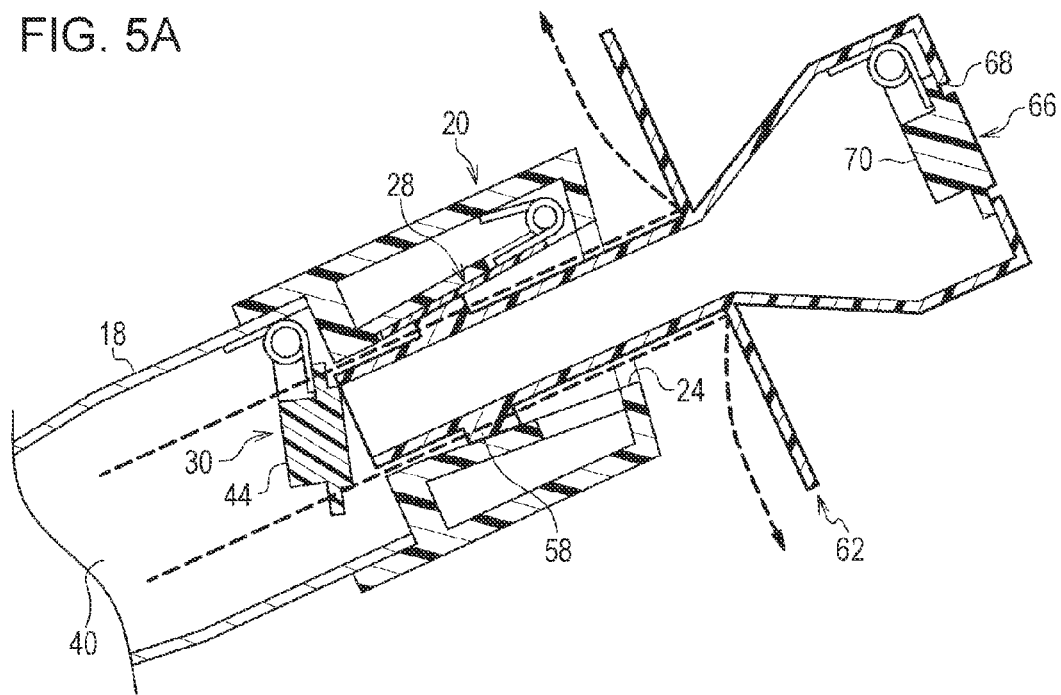
FIG. 5A is an explanatory diagram illustrating the flow direction of fuel vapor in the present disclosure.
Figure 5B:
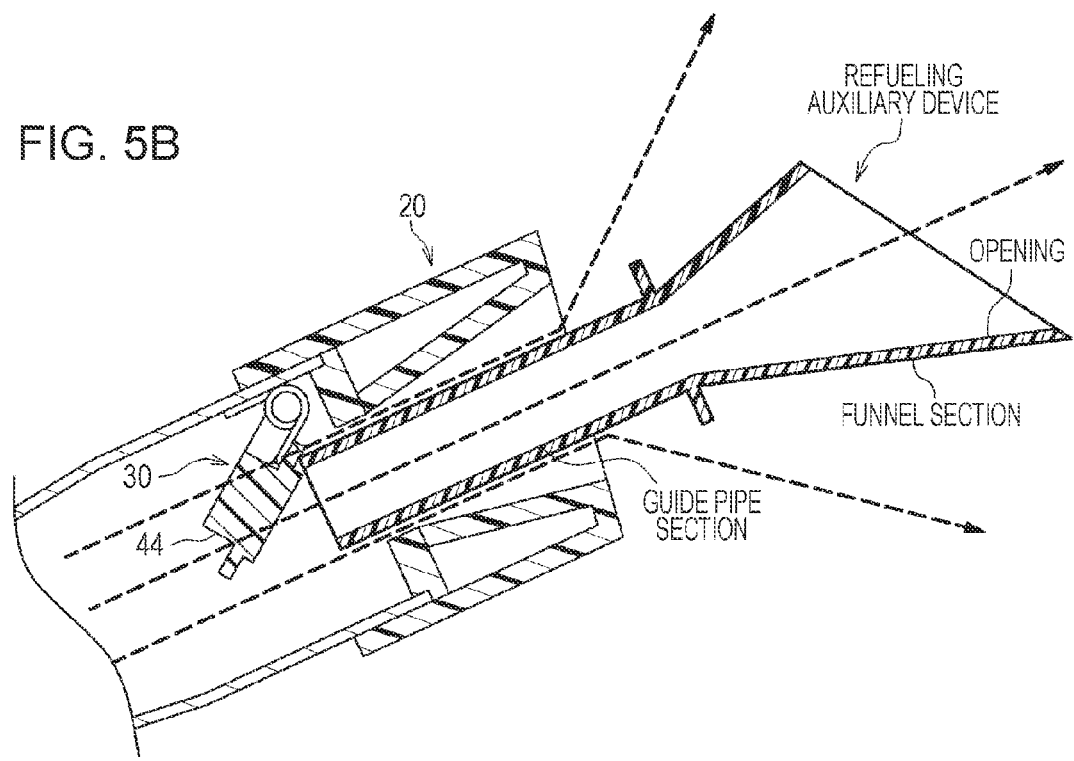
FIG. 5B is an explanatory diagram illustrating the flow direction of fuel vapor in a comparative example taken up by the assignee.

FIG. 5A is an explanatory diagram illustrating the flow direction of fuel vapor in the present disclosure, and FIG. 5B is an explanatory diagram illustrating the flow direction of fuel vapor in a comparative example taken up by the assignee.

As illustrated in FIG. 5A, in the present embodiment, fuel vapor (see thick dashed line) discharged from the filler pipe comes into contact with the disk section of the fuel vapor shield section, then is dispersed to the outside. Thus the disk section serves as an obstacle to avoid movement of fuel vapor to the funnel section. On the other hand, in the comparative example, as illustrated in FIG. 5B, nothing is provided to block the movement of fuel vapor (see thick dashed line), and thus the fuel vapor is dispersed to a wide range including the funnel section.

In the present embodiment, even when the fuel vapor shield section 62 is provided, the length of the guide pipe section 52 is not increased and the outer diameter of the fill opening side shut-off valve 28 is not increased, and thus the fuel vapor shield section 62 may be easily provided. It is to be noted that manufacturing is made more simple by providing the fuel vapor shield section 62 integrally with the guide pipe section 52 and the funnel section 54 using, for instance, resin material.

Furthermore, in the present embodiment, it is possible to further reduce blow-back of fuel vapor to the outside by providing the check valve 66 at the end of the funnel section 54. On the other hand, in the comparative example, as illustrated in FIG. 5B, the check valve is not provided but the end of the funnel section is open, and thus the fuel vapor is dispersed through the opening. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A refueling auxiliary device which is used for a vehicle including a capless refueling mechanism and part of which is to be inserted into the capless refueling mechanism that includes a fill opening side shut-off valve disposed near a fill opening and a fuel tank side shut-off valve that is disposed nearer to a fuel tank than the fill opening side shut-off valve, the refueling auxiliary device comprising:
   a funnel section;
   a guide pipe section that is connected to a fuel tank side of the funnel section and that presses and moves the fill opening side shut-off valve and the fuel tank side shut-off valve away from a seat portion; and
   a regulation unit that regulates a valve opening degree of the fuel tank side shut-off valve,
   wherein an end of the funnel section, through which a nozzle is inserted, is provided with a check valve.

2. The refueling auxiliary device according to claim 1, wherein the regulation unit is an enlarged diameter section that is provided on an outer circumferential surface of the guide pipe section and that is reversely tapered gradually toward the funnel section.

3. The refueling auxiliary device according to claim 1, wherein a fuel vapor shield section that shields fuel vapor is provided between the guide pipe section and the funnel section.

4. The refueling auxiliary device according to claim 1, wherein the regulation unit regulates a degree of insertion of the guide pipe section into the capless refueling mechanism.

5. The refueling auxiliary device according to claim 4, wherein the regulation unit is disposed between the fuel vapor shield section and a tip end of the guide pipe section.

6. The refueling auxiliary device according to claim 3, wherein the fuel vapor shield section is a circular disk.

7. The refueling auxiliary device according to claim 1, wherein the fuel tank side shut-off valve closes a communication hole of the capless refueling mechanism.

8. The refueling auxiliary device according to claim 2, wherein the capless refueling mechanism includes an inner circumferential wall including an engagement surface contacting the enlarged diameter section.

9. A vehicle comprising the refueling auxiliary device according to claim 1.

* * * * *